United States Patent [19]

Hashimoto et al.

[11] Patent Number: 5,013,023
[45] Date of Patent: May 7, 1991

[54] TEMPORARY SLIP STACKING APPARATUS OPERABLE IN A FIRST-IN FIRST-OUT MODE

[75] Inventors: Toshiharu Hashimoto, Tokyo; Kazuhiko Shibata; Makoto Kobayashi, both of Takasaki, all of Japan

[73] Assignee: Oki Electric Industry Co., Ltd., Tokyo, Japan

[21] Appl. No.: 577,819

[22] Filed: Sep. 4, 1990

Related U.S. Application Data

[63] Continuation of Ser. No. 402,846, Sep. 6, 1989, abandoned.

[30] Foreign Application Priority Data

Sep. 6, 1988 [JP] Japan .................. 63-221460

[51] Int. Cl.$^5$ .............................. B65H 83/00
[52] U.S. Cl. ............................. 271/3.1; 271/163; 271/295; 271/902
[58] Field of Search ........... 271/3, 3.1, 163, 292, 271/294–295, 902

[56] References Cited

U.S. PATENT DOCUMENTS

| 4,145,038 | 3/1979 | Mol | 271/295 |
| 4,398,712 | 8/1983 | George | 271/295 |
| 4,456,239 | 6/1984 | Yamaguchi | 271/3.1 |
| 4,473,223 | 9/1984 | Lap | 271/295 |
| 4,486,012 | 12/1984 | Böck et al. | 271/902 |
| 4,735,407 | 4/1988 | Ozawa | 271/3.1 |
| 4,753,431 | 6/1988 | Fujimoto et al. | 271/3.1 |
| 4,804,175 | 2/1989 | Grandjean | 271/902 |

FOREIGN PATENT DOCUMENTS

| 1111569 | 7/1961 | Fed. Rep. of Germany. |
| 1594742 | 4/1971 | Fed. Rep. of Germany. |
| 1549669 | 9/1971 | Fed. Rep. of Germany. |
| 44433 | 3/1980 | Japan | 271/3.1 |
| 140456 | 6/1986 | Japan | 271/3.1 |
| 1820 | 4/1985 | PCT Int'l Appl. | 271/3.1 |

Primary Examiner—Robert P. Olszewski
Assistant Examiner—Steven Reiss
Attorney, Agent, or Firm—Spencer & Frank

[57] ABSTRACT

An apparatus for receiving slips and stacking the slips temporarily therein to process them or to exchange them for another kind of slips, and having a stop and guide which defines a transport path for receiving and transporting a slip, a stationary storing section which defines a space for holding the slip temporarily therein, and a feeder for feeding the slip into and out of the stationary storing section. A movable storing section is interposed between the stop and guide and the stationary storing section for defining compartments each of which accommodates a part of any of the slips therein.

12 Claims, 8 Drawing Sheets

TEMPORARY SLIP STACKING APPARATUS OPERABLE IN A FIRST-IN FIRST-OUT MODE

This application is a continuation of application Ser. No. 07/402,846, filed Sept. 6th, 1989, now abandoned.

BACKGROUND OF THE INVENTION

1. Field of the Invention

The present invention relates to an apparatus for stacking slips temporarily therein and, more particularly, to a temporary slip stacking apparatus which receives airline tickets or similar slips and stacks them temporarily therein for processing them or exchanging them for another kind of slips such as boarding tickets.

2. Description of the Prior Art

A temporary slip stacking apparatus is used with slip processing terminal equipment which exchanges primary slips such as flight reservations or cash vouchers for secondary slips such as boarding tickets.

Slip processing terminal equipment with a temporary slip stacking apparatus of the type described is disclosed in Japanese Patent Laid-Open Publication No. 265362/1988 assigned to the same assignee as the assignee of the present invention. The equipment disclosed in this Laid-Open Publication is constructed such that when a reservation ticket, cash voucher or similar primary slip is inserted into an inlet, an identification data reading section, a magnetic reading section and an optical reading section read various kinds of data out of the slip and, then, the slip is transported to the temporary stacking apparatus. Whether the slip introduced in the equipment should be processed or should be exchanged for a secondary slip is determined on the basis of the data readout thereof. When the slip is to be processed, it is fed out of the stacking apparatus, processed, and then driven out of the equipment via an outlet. On the other hand, when the slip is to be exchanged for a secondary slip, a medium from which the secondary slip is to be produced is fed from a hopper, subjected to predetermined processing, and then discharged via the outlet as a secondary slip. In this case, the primary slip is fed out of the temporary stacking apparatus to a stacker which is installed in the equipment body. The medium mentioned above may be a blank paper sheet when, for example, the secondary slip is to be produced by printing.

As stated above, a temporary stacking apparatus implements an essential function of slip processing terminal equipment, i.e., holding entered slips for a moment until processing with the slips has been completed on the basis of data stored therein. Various approaches are available for holding slips temporarily and then feeding them out one by one, and the temporary stacking apparatus is provided with one configuration or another depending upon the approach selected. Especially, when it is desired to process slips rapidly according to the order of customers who are waiting in line at the counter of an airport, for example, it is necessary that the stacking apparatus be provided with a first-in, first-out operation capability, i.e., a capability for feeding out the first slip first. A technology for implementing such a first-in, first-out mode operation has not been reported yet.

SUMMARY OF THE INVENTION

It is therefore an object of the present invention to provide a temporary slip stacking apparatus which is operable in a first-in, first-out mode.

In accordance with the present invention, in an apparatus for receiving slips and stacking the slips temporarily therein to process them or to exchange them for another kind of slips, and having a stop and guide which defines a transport path for receiving and transporting a slip, a stationary storing section which defines a space for holding the slip temporarily therein, and feeding means for feeding the slip into and out of the stationary storing section, a movable storing section is interposed between the stop and guide and the stationary storing section for defining compartments each of which accommodates a part of any of the slips therein. The movable storing section has a plurality of partition members, a sectorial rotatable plate supporting the partition members, and a shaft supporting the rotatable plate. The partition members extend radially toward the shaft to define the compartments. The compartments are so oriented as to commonly communicate with the stationary storing section and to communicate with the stop and guide one at a time. Driving means rotates the rotatable plate about the shaft. The stop and guide has walls having an opening communicating with the transport path for closing the ends of the compartments except for one compartment which is held in communication with the stop and guide. The feeding means has a first feeding section having feed rollers, urges the feed rollers toward the space, and drives them to feed the slip in the space. A second feeding section has feed rollers located at the opposite side to the feed rollers of the first feeding section with respect to the stationary storing section, urges its feed rollers toward the space, and drives them to feed the slip in the space. When a slip is to be fed into the stationary storing section, a controller controls the driving means for rotating the rotatable plate to cause one compartment with respect to a first order into communication with the stop and guide, and controls the first feeding section to drive its feed rollers so as to introduce the slip into the space such that the slip adjoins the other slips in order while being partly left in the compartment. When the slip is to be fed out of the stationary storing section in a first-in, first-out mode, the controller controls the driving means for rotating the rotatable plate to cause one compartment with respect to the first order into communication with the stop and guide, and controls the second feeding section for driving its feed rollers to feed the slip out of the space via one compartment.

BRIEF DESCRIPTION OF THE DRAWINGS

The objects and features of the present invention will become more apparent from the consideration of the following detailed description taken in conjunction with the accompanying drawings in which.

In the figures, similar components and structural elements are designated by the same reference numerals, and redundant description will be avoided for simplicity.

DESCRIPTION OF THE PREFERRED EMBODIMENTS

Figure 1:
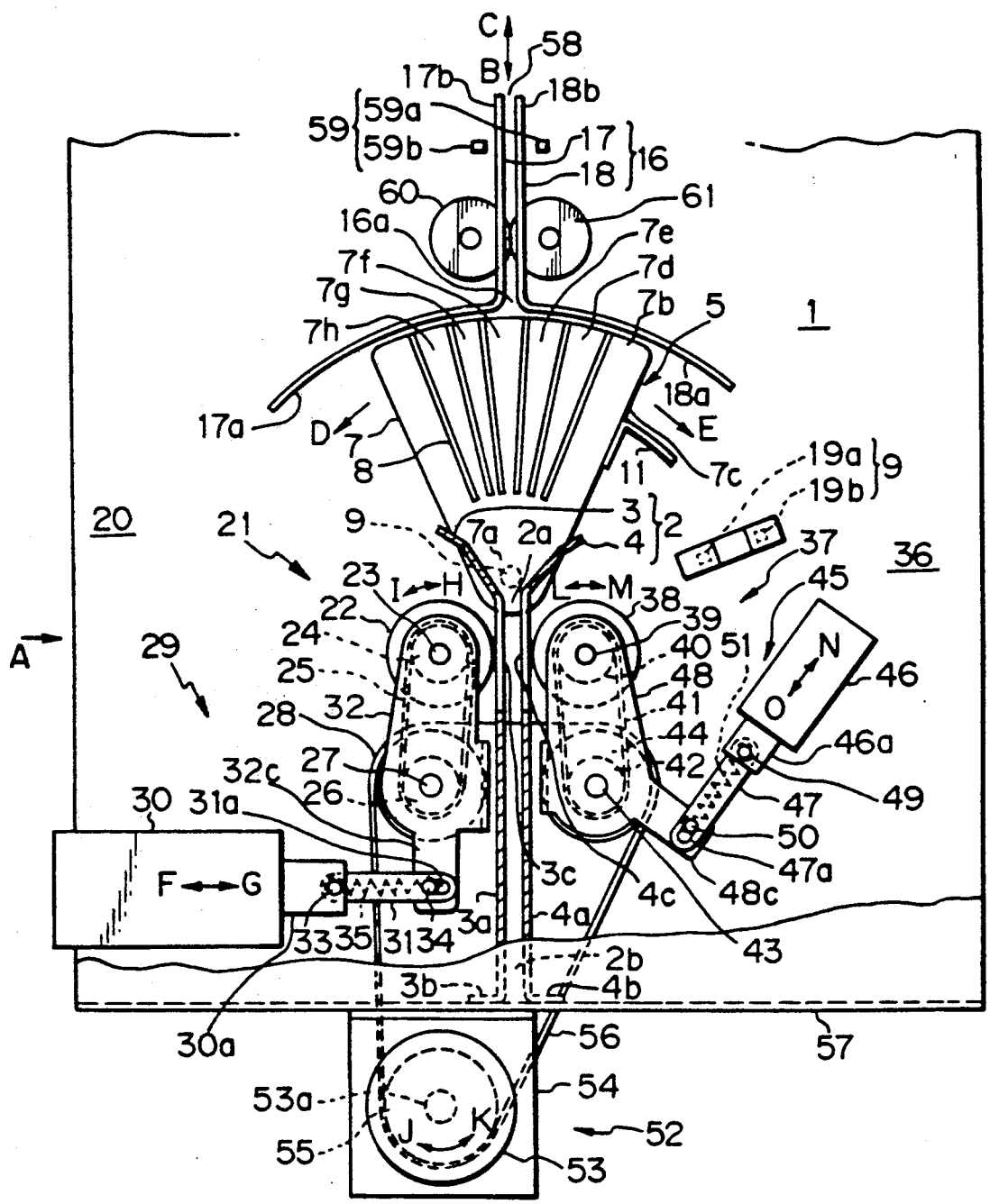
FIG. 1 is a partly taken away and partly sectional elevation of a temporary slip stacking apparatus embodying the present invention.

Referring to FIG. 1 of the drawings, a temporary slip stacking apparatus with a first-in, first-out capability embodying the present invention is shown and basically handles airline tickets, cash vouchers or similar primary slips. As shown, the apparatus is generally made up of a storing section 1, a first and a second feeding section 20 and 36, respectively, which accommodate and feed slips, and a driving section 52 for driving the first and second feeding sections 20 and 36.

Figure 2:
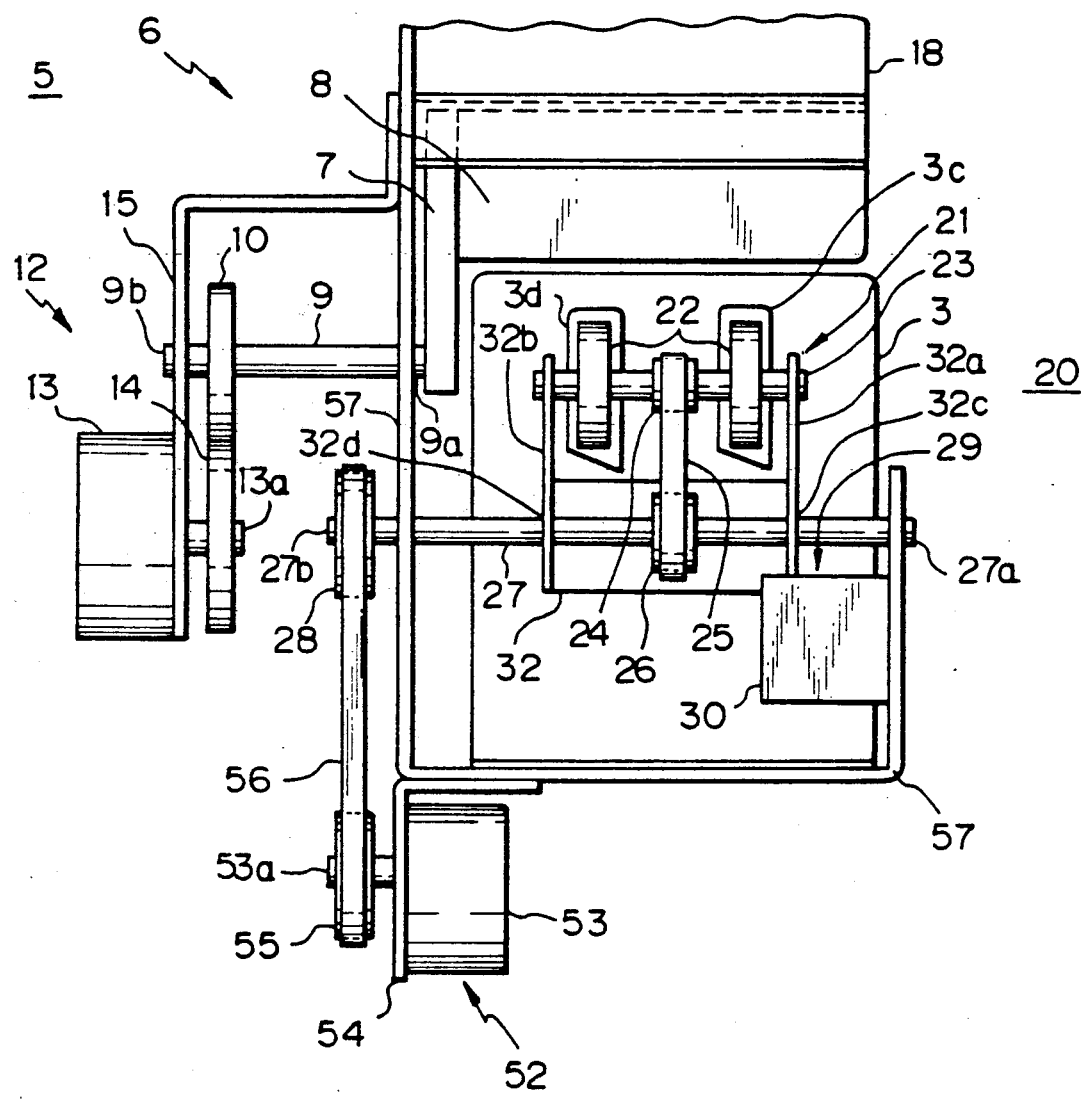
FIG. 2 is a fragmentary side elevation of the apparatus shown in FIG. 1 as viewed in a direction A in the figure.

The storing section 1 has a stationary storing subsection 2 for accommodating one end portion of slips while causing them to adjoin each other, a movable storing subsection 5 for accommodating the other end portion of the slips while physically separating the latter, and a stop and guide 16. The stationary subsection 2 is constituted by a pair of substantially L-shaped plates 3 and 4. Specifically, the plate 3 has a longer portion 3a and a shorter portion 3b which merge into each other in the form of a letter L, while the plate 4 has a longer portion 4a and a shorter portion 4b which also join each other in the form of a letter L. The longer portions 3a and 4a of the plates 3 and 4 define an extension of a transport path 58 which is formed in an apparatus body, not shown. The longer portions 3a and 4a are spaced apart from each other by a predetermined distance. The apparatus body has a frame 57 on which the shorter portions 3b and 4b of the plates 3 and 4 are rigidly mounted. The stationary subsection 2, therefore, has an open end 2a and a bottomed space 2b which terminates at the open end 2a. As best shown in FIG. 2, a pair of rectangular openings 3c and 3d are formed through the plate 3, while a pair of feed rollers 22 included in the first feeding section 20 are capable of making access to the space 2b through the openings 3c and 3d.

As shown in FIG. 2, the movable subsection 5 is generally comprised of a rotary mechanism 6 and a driving mechanism 12. The rotary mechanism 6 includes a rotatable sectorial plate 7 which is rigidly mounted on a rotatable shaft 9 at one side and at a pivot 7a thereof. A gear 10 is rigidly mounted on the end of the shaft 9 which is remote from the rotatable plate 7. A plurality of partition members in the form of plates 8 extend out from a circumferential edge portion 7b of the other side of the sectorial plate 7 and radially with respect to the center of the shaft 9. The plate 7 is positioned such that its side where the partition members 8 are arranged is perpendicular to the extension of the transport path 58 with the pivot, or center of rotation, 7b being aligned with the opening 2a of the stationary subsection 2. The partition members 8 cooperate to define compartments 7d, 7e, 7f, 7g and 7h for receiving slips on the side of the plate 7 where they are arranged. As shown in FIG. 2, the shaft 9 is rotatably supported at one end 9a by the frame 57 of the apparatus body and at the other end 9b by a motor bracket 15 which is securely mounted on the frame 57. The motor bracket 15 forms a part of the driving mechanism 12. The sectorial plate 7 is mounted on the end 9a of the shaft 9. The previously mentioned gear 10 is rigidly mounted on the shaft 9 between the frame 57 and the motor bracket 15.

The driving mechanism 12 has a stepping motor 13 and a gear 14 in addition to the motor bracket 15. The stepping motor 13 has an output shaft 13a on which the gear 14 is rigidly mounted. The gear 14 is held in constant mesh with the gear 10 of the rotary mechanism 6. As shown in FIG. 1, a substantially L-shaped sensor bar 11 is mounted on one radial edge 7c of the sectorial plate 7, while a home position sensor 19 is mounted on the frame 57 of the apparatus body to sense the sensor bar 11. In the illustrative embodiment, the home position sensor 19 is implemented by a light emitting element 19a and a light-sensitive element 19b.

The stop and guide 16 is made up of a pair of plates 17 and 18 having respectively an arcuate wall portion 17a and a straight guide portion 17b, and an arcuate wall portion 18a and a straight guide portion 18b. The arcuate wall portions 17a and 18a individually extend along the circumferential edge 7b of the sectorial plate 7. The guide portions 17b and 18b are located at a predetermined distance from each other at opposite sides of the transport path 58, while the wall portions 17a and 18a are positioned symmetrically to each other with respect to the transport path 58. In this configuration, the ends of the wall portions 17a and 18a which adjoin the associated guide portions 17b and 18b define an opening 16a. A sensor 59 has a light emitting element 59a and a light-sensitive element 59b which are individually located at opposite sides of the guide portions 17b and 18b of the stop and guide 16. A pair of transport rollers 60 and 61 are journalled to the apparatus body and interposed between the sensor 59 and the opening 16a, of the stop and guide 16. The transport rollers 60 and 61 drive a slip, e.g., 62a, FIG. 6A to the storing section 1.

The first feeding section 20 is constituted by a feeding mechanism 21 and a pressing mechanism 29. The feeding mechanism 21 has shafts 23 and 27, intermediate pulleys 24, 26 and 28, and a belt 25 as well as the previously mentioned feed rollers 22. Each feed roller 22 has an outer peripheral portion which is made of a material having a substantial coefficient of friction. As shown in FIG. 2, the pressing mechanism 29 includes a generally U-shaped bracket 32 having arms 32a and 32b. The shaft 23 is journalled to the arms 32a and 32b of the bracket 32 at opposite ends thereof. The shaft 27 has opposite ends 27a and 27b thereof journalled to the frame 57 of the apparatus body. The pulley 24 is rigidly mounted on the intermediate portion of the shaft 23. The feed rollers 22 are individually mounted on the shaft 23 between the pulley 24 and the arms 32a and 32b of the bracket 32. The pulley 26 is mounted on the intermediate portion of the shaft 27, while the pulley 28 is mounted on the end 27b of the shaft 27 which protrudes from the frame 57. The belt 25 is passed over the pulleys 24 and 26.

As shown in FIGS. 1 and 2, the pressing mechanism 29 is made up of a solenoid 30, a link 31, the generally U-shaped bracket 32, pins 33 and 34, and a tension spring 35. The solenoid 30 is securely mounted on the frame 57 to play the role of providing a drive source. As FIG. 2 indicates, the opposite arms 32a and 32b of the bracket 32 are respectively provided with slide holes 32c and 32d at one end thereof. The shaft 27 of the previously stated feeding mechanism 21 extends through the slide holes 32c and 32d with the pulley 26 intervening between the arms 32a and 32b. The shaft 23 of the feeding mechanism 21 is journalled at opposite ends thereof to the other end of the arms 32a and 32b of the bracket 32. A projection 32c, FIG. 1, extends out from one end of the arm 32a of the bracket 32, while a pin 34 is studded on the projection 32c. The pin 34 is slidably received in an oval slot 31a which is formed through one end of the link 31. The solenoid 30 has a plunger 30a to which the other end of the link 31 is rotatably connected by a pin 33. The tension spring 35 is anchored at one end to the pin 33 and at the other end to the pin 34.

The second feeding section 36 is generally comprised of a feeding mechanism 37 and a pressing mechanism 45. The feeding section 37 has feed rollers 38, shafts 39 and 43, pulleys 40, 42 and 44, and a belt 41. Advantageously, the feeding mechanism 37 is identical with the feeding mechanism 21 of the first feeding section 20 as to the dimensions, contours and combination of the various structural elements. Specifically, the configuration of the feeding mechanism 37 will be understood by replacing its structural elements shown in FIG. 1 with the associated structural elements of the feeding mechanism 21 shown in FIG. 2.

The pressing mechanism 45 is composed of a solenoid 46 rigidly mounted on the frame 57 of the apparatus body for serving the function of a drive source, a link 47, a rotatable member in the form of a U-shaped bracket 48, pins 49 and 50, and a tension spring 51. Such structural elements of the pressing mechanism may advantageously be identical with the structural elements of the pressing mechanism 29 of the first feeding section 20 as to the dimensions and contours, except for the bracket 48. The bracket 48 may have the same dimensions and contour as the bracket 32 of the first feeding section 20, except for the position of a projection 48c. Specifically, the bracket 48 is rotatably mounted on an intermediate portion of the shaft 43. While the bracket 48 is mounted on the shaft 43 in the same manner as the bracket 32 of the first feeding section 20 which is mounted on the shaft 27, the former is different from the latter with respect to the level or height. Hence, the position of the pulley 42 of the feeding mechanism is not identical with the position of the pulley 26 of the first feeding section 30. The pin 50 is studded on the projection 48c of the bracket 48 and slidably received in an oval slot 47a which is formed through one end of the link 47. The solenoid 46 has a plunger 46a to which the other end of the link 47 is rotatably connected by the pin 49. The tension spring 51 is preloaded between the pins 49 and 50.

The driving section 52 has a stepping motor 53, a motor bracket 54, a pulley 55, and a belt 56. The motor bracket 54 on which the stepping motor 53 is mounted is rigidly mounted on the frame 57 of the apparatus body. The stepping motor 53 has an output shaft 53a on which the pulley 55 is securely fitted, as shown in FIG. 2. The belt 56 is passed over the pulley 55, the pulley 28 of the first feeding section 20, and the pulley 44 of the second feeding section 36.

Control circuitry associated with the above-stated mechanical construction and arrangement will be described with reference to FIG. 3. As shown, the control circuitry has a controller 63 which may advantageously be implemented by a microprocessor and a memory. The controller 63 is connected to an I/O (Input/Output) port 64 by a bus line 67. A DC power source 66 is connected to the controller 63 by a line 79 of the power source 66, a switch 80, and a line 78 of the controller 63. The switch 80 is provide on an operation board of the terminal equipment, not shown. The home position sensor 19 senses the home position of the movable storing subsection 5 when the stacking apparatus is initialized, while the sensor 59 senses slips such as tickets. The home position sensor 19 and sensor 59 are connected to the input of the I/O port 64 by lines 76 and 77, respectively. The solenoid 30 of the first feeding section 20 is connected to the output of the I/O port 64 by lines 68 and 72 via a driver 65. Likewise, the solenoid 46 of the second feeding section 36 is connected to the output of the I/O port 64 by lines 69 and 73 via the driver 65. Further, the stepping motor 13 of the first feeding section 20 and the stepping motor 53 of the second feeding section 36 are connected to the output of the I/O port 64 by lines 70 and 74 and lines 71 and 75, respectively. The driver 65 selects a particular drive control signal fed thereto from the controller 63 via the I/O port 64, in response to a selection control signal also fed thereto from the controller 63. After amplifying the drive control signal, the driver 65 drives any of the solenoids 30 and 46 and stepping motors 13 and 53. The DC power source 66 applies necessary power to the controller 63, I/O port 64, driver 65, solenoids 30 and 46, stepping motors 13 and 53, home position sensor 19, and sensor 59.

Figure 4:
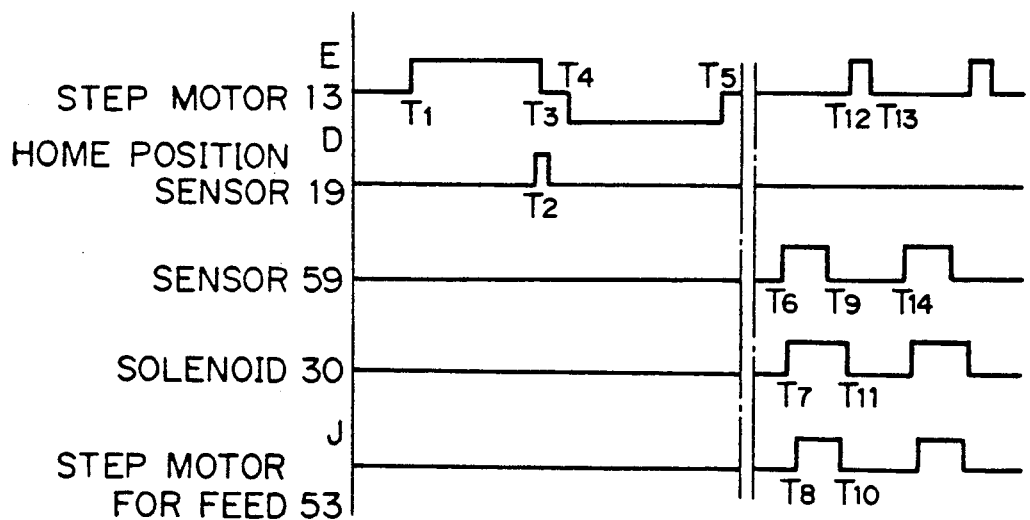
FIG. 4 is a timing chart demonstrating the operation of the illustrative embodiment for receiving a slip.
Figure 5A:
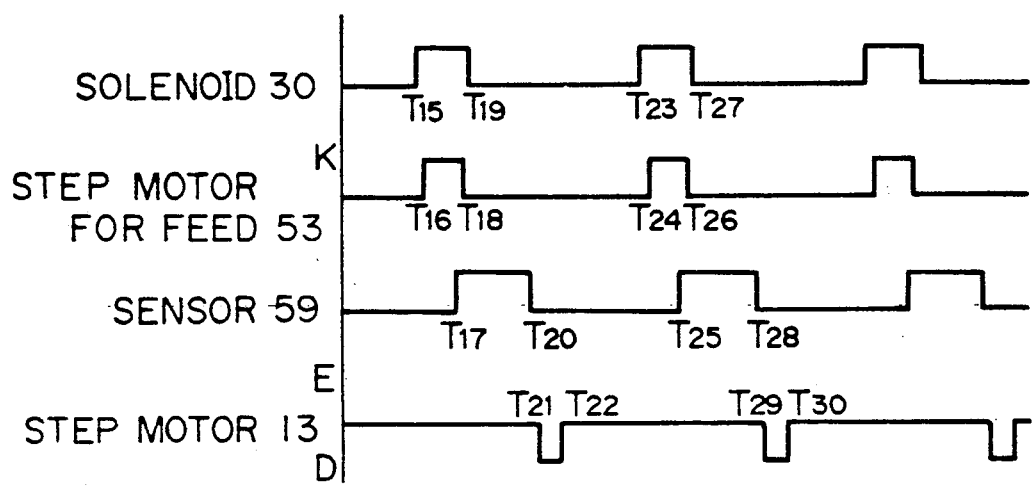
FIG. 5A is a timing chart representative of the operation of the embodiment for feeding out a slip in a first-in, last-out mode.
Figure 5B:
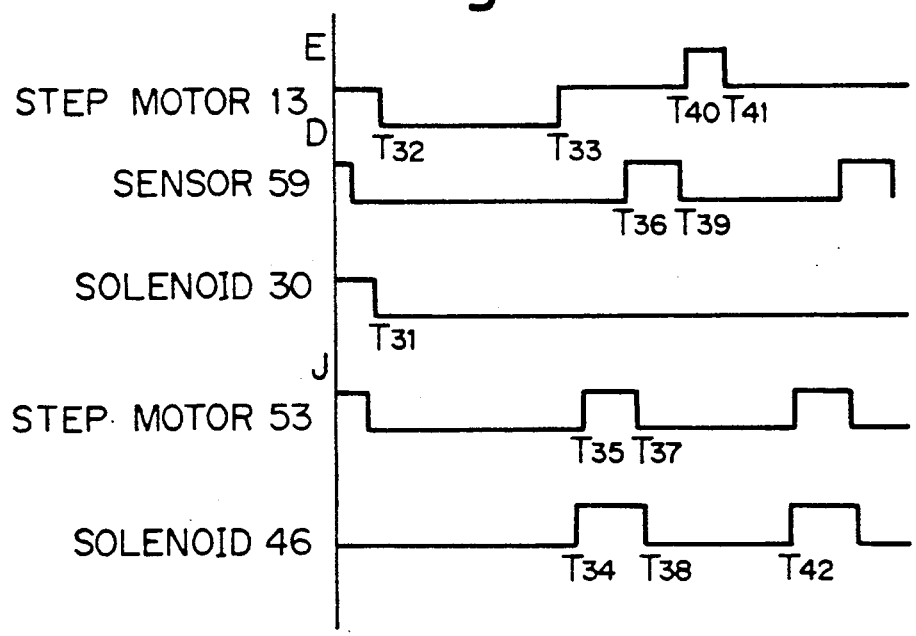
FIG. 5B is a timing chart representative of the operation of the embodiment for feeding out a slip in a first-in, first-out mode.

The operation of the temporary stacking apparatus having the above construction and arrangement will be described with reference to FIGS. 4, 5A and 5B as well as to FIGS. 6A, 6B, 7A and 7B.

When a first-in, last-out mode is selected, the stacking apparatus will be operated as follows. As shown in FIG. 4, assume that the operator has pressed the switch 80 shown in FIG. 3 at a time $T_1$. Then, the controller 63 energizes the stepping motor 13 of the movable storing subsection 5 to rotate the rotary mechanism 6 shown in FIGS. 1 and 6A in a direction indicated by an arrow E. It is to be noted that the energizing directions of the stepping motor 13 shown in FIG. 4 are associated with the rotating directions D and E of the rotary mechanism 6. As the home position sensor 19 senses the sensor bar 11 at a time $T_2$, the stepping motor 13 is temporarily brought to a stop at a time $T_3$. Then, at a time $T_4$, the stepping motor 13 is driven in the opposite direction to in turn rotate the rotary mechanism 6 as indicated by an arrow D, until the first compartment 7d of the sectorial plate 7 has been positioned on an imaginary line which interconnects the transport path 58 and the space 2b of the stationary storing subsection 2. This position on such an imaginary line will hereinafter be referred to as a feed start position for simplicity. At a time $T_5$, the stepping motor 13 is deenergized.

Figure 6A:
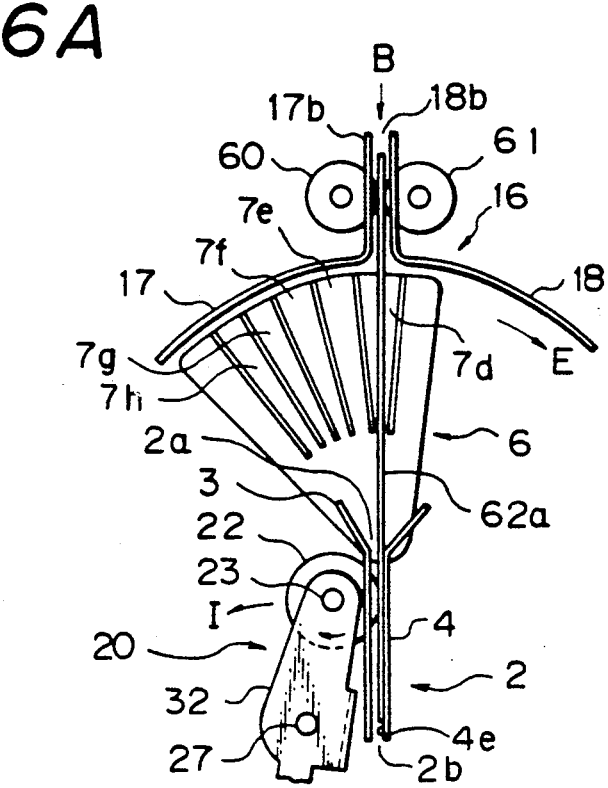
FIGS. 6A and 6B are fragmentary views showing the apparatus of FIG. 1 in different conditions for feeding out a slip in a first-in last-out mode.
Figure 6B:
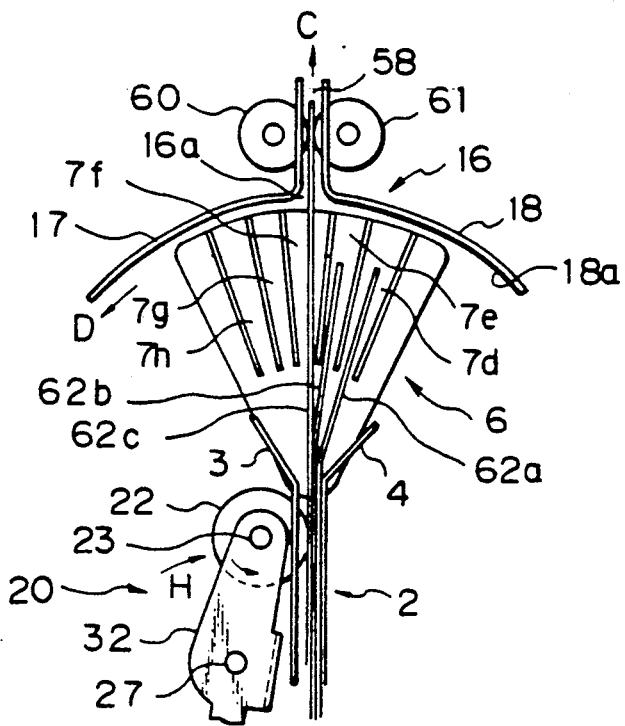

Subsequently, a ticket or similar slip 62a shown in FIG. 6A is inserted into an inlet, not shown, formed in terminal equipment with which the temporary stacking apparatus is associated. In response, the controller 63 drives rollers arranged on a transport path of the equipment, not shown, to transport the ticket 62a toward the temporary stacking apparatus. An identification data reading section, a magnetic reading section and an optical reading section are located along the transport path to read various kinds of data out of the ticket 62a being transported. The ticket 62a is introduced in the temporary stacking apparatus in a direction indication by an arrow B as shown in FIG. 6A. At a time $T_6$, the sensor 59 located in close proximity to the stop and guide 16 senses the leading edge of the ticket 62a. Then, at a time $T_7$, the solenoid 30 of the first feeding section 20 is energized to pull its plunger 30a in a direction indicated by an arrow F, whereby the bracket 32 associated with the solenoid 30 is rotated about the shaft 27 as indicated by an arrow H. As a result, the feed rollers 22 of the first feeding section 20 are moved into the space 2b of the stationary storing subsection 2 until their periphery abuts against the inner surface 4e of the plate 4. At this instant, the tension spring 35 exerts a tensile force on the feed rollers 22 in a direction indicated by an arrow I.

Figure 3:
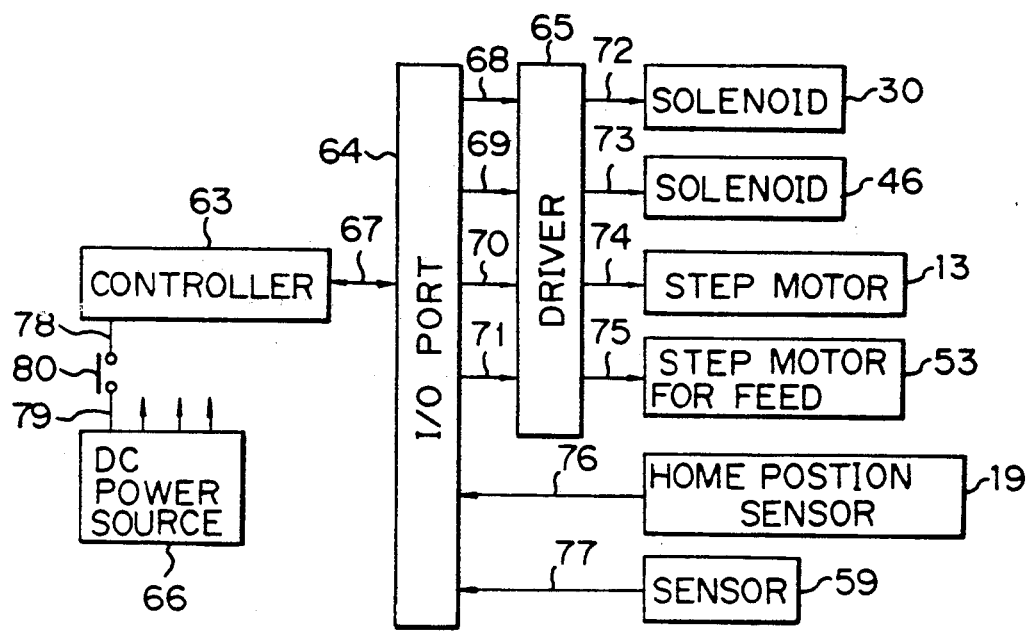
FIG. 3 is a schematic block diagram showing a specific electrical arrangement for controlling various mechanisms included in the illustrative embodiment.

At a time $T_8$, the stepping motor 53 of the driving section 52 shown in FIGS. 1 and 3 is driven in such a manner as to rotate in a direction J in synchronism with the transport rollers 60 and 61 of the apparatus body. At this time, the leading edge of the ticket 62a has been moved away from the sensor 59 to enter the compartment 7d of the movable storing subsection 5. The ticket 62a is further transported in the direction B due to the difference in the coefficient of friction between the coactive transport rollers 60 and 61 and the feed rollers 22 and plate inner surface 4e.

As the output of the sensor 59 representative of the presence of the slip 62a disappears at a time $T_9$, the stepping motor 53 is brought to a stop at a time $T_{10}$ after continuously receiving the drive control signal from the controller 63 for a predetermined period of time. Then, at a time $T_{11}$, the solenoid 30 is deenergized to stop pulling its plunger 30a with the result that the plunger 30a is shifted in a direction G by biasing means, not shown. This causes the bracket 32 of the first feeding section 20 to rotate about the shaft 27 in the direction I, whereby the feed rollers 22 are moved away from the stationary subsection 2. At a time $T_{12}$, the stepping motor 13 of the movable subsection 5 is rotated to in turn rotate the rotary mechanism 6 in the direction E until the next compartment 7e has been brought to the position on the imaginary line which interconnects the transport path 58 and the space 2b of the stationary subsection 2. At a time $T_{13}$, the stepping motor 13 is deenergized. When the sensor 59 senses another slip which may be introduced in the apparatus after the slip 62a, the sequence of steps having been executed after the time $T_6$ is repeated.

How the slips sequentially stacked in the apparatus in the first-in, last-out mode are fed out will be described with reference to FIGS. 5A and 5B. At a time $T_{15}$, the controller 63 shown in FIG. 3 energizes the solenoid 30 of the first feeding section 20 shown in FIG. 1 so as to rotate the bracket 32 and, therefore, the feed rollers 22 in the direction H. Subsequently, at a time $T_{16}$, the controller 63 rotates the stepping motor 53 of the driving section 52 in a direction indicated by an arrow K. As a result, the feed rollers 22 feed out a ticket 62c having been accommodated in a particular compartment which is in alignment with the transport path 58, compartment 7f in this example, as indicated by an arrow C in FIG. 6B. At this instant, it may occur that any of the other tickets having been received in the other compartments, e.g., tickets 62b and 62a having been received in the compartments 7e and 7d, respectively, are entrained by the ticket 62c due to friction ascribable to smears on the tickets, for example. Nevertheless, they are stopped by the wall 18a of the stop and guide 16. As the leading edge of the ticket 62c is driven away from the opening 16a of the stop and guide 16, it is nipped by the transport rollers 60 and 61 of the apparatus body and thereby further transported in the direction C.

When the sensor 59 senses the leading edge of the ticket 62c at a time $T_{17}$, the stepping motor 53 is deenrgized at a time $T_{18}$ and, at the subsequent time $T_{19}$, the solenoid 30 is deenergized to stop pulling its plunger 30a. As the output of sensor 59 representative of the presence of the ticket 62c disappears at a time $T_{20}$, the stepping motor 13 associated with the movable storing subsection 5 is driven to rotate the rotary mechanism 6 in the direction D. When the compartment 7e next to the compartment 7f aligns with the transport path 58, i.e., the feed start position, the stepping motor 13 is deenergized at a time $T_{22}$. The ticket 62c fed out of the temporary stacking apparatus by the above procedure is driven by the transport rollers of the terminal equipment toward an outlet, not shown. On the lapse of a predetermined period of time, the controller 63 starts on the above processing again at a time $T_{23}$ so as to feed out the other tickets 62b and 62a sequentially in the same manner.

Figure 7A:
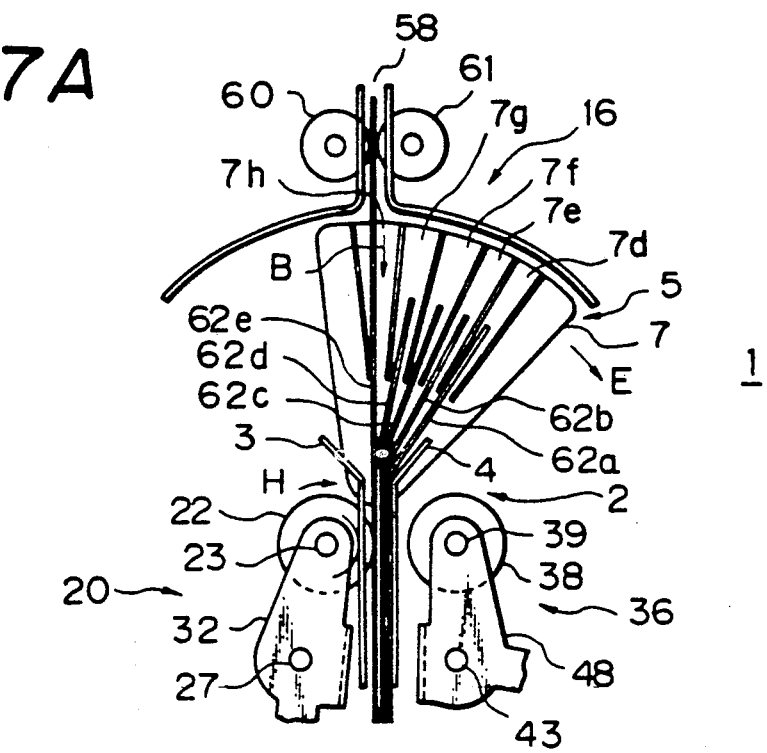
FIG. 7A and 7B are views similar to FIGS. 6A and 6B, showing different conditions for feeding out a slip in a first-in first-out mode.
Figure 7B:
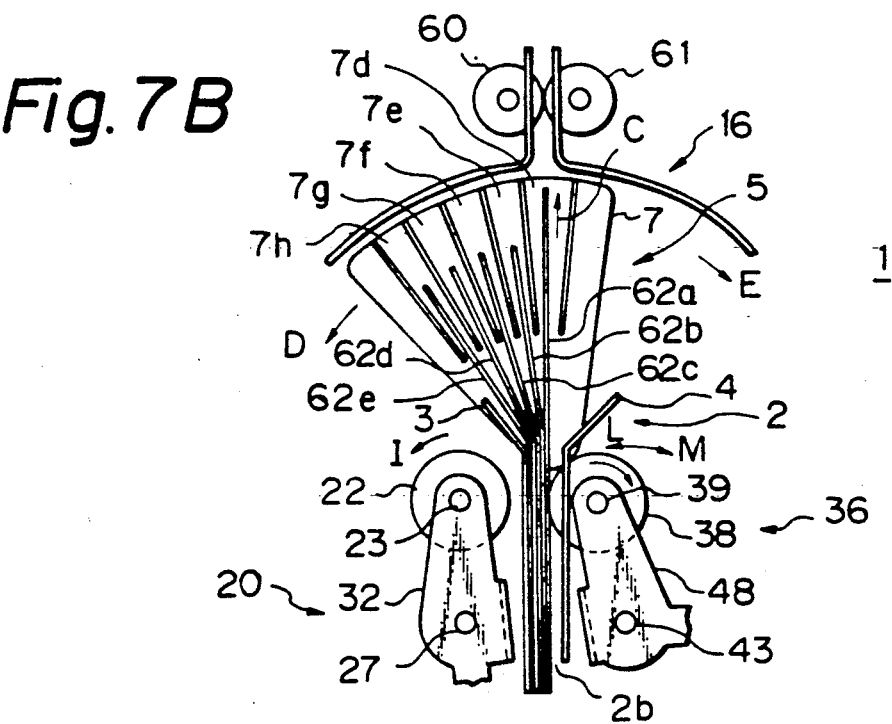

The temporary slip stacking apparatus is operable in a first-in, first-out mode, as follows. The first-in, first-out mode operation is exactly the same as the first-in, last-out mode operation so far as the procedure for stacking slips one by one in the apparatus is concerned. Specifically, as shown in FIG. 4, when the switch 80 shown in FIG. 3 is pressed at the time $T_1$, the movable storing subsection 5 is shifted to the feed start position as stated previously. Every time a ticket or similar slip is stacked in the storing section 1, the movable subsection 5 is angularly moved stepwise in the direction E so as to receive the ticket therein. FIG. 7A shows tickets 62a, 62b, 62c, 62d and 62e which are sequentially stacked in the storing section 1 by the above procedure. As soon as the last slip, e.g., the ticket 62e is settled in the storing section 1, the solenoid 30 of the first feeding section 20 is deenergized at a time $T_{31}$ shown in FIG. 5B. As a result, the bracket 32 is rotated in the direction I to shift the feed rollers 22 away from the stationary subsection 2, as shown in FIG. 7B. Then, at a time $T_{32}$, the stepping motor 13 of the movable subsection 5 is rotated in the opposite direction to rotate the sectorial plate 7 in the direction D. When the compartment 7d of the sectorial plate 7 is brought to the position on the line interconnecting the transport path 58 and the space 2b of the stationary subsection 2, i.e., the feed start position, the rotation of the stepping motor 13 is interrupted at a time $T_{33}$.

At a time $T_{34}$, the solenoid 46 of the second feeding section 36 is energized to rotate the bracket 48 in a direction indicated by an arrow L. Moving integrally with the bracket 48, the feed rollers 38 are partly accommodated in the bore 2b of the stationary subsection 2 to thereby sandwich the bunch of tickets in cooperation with the plate 3 of the stationary subsection 2. At a time $T_{35}$, the stepping motor 53 of the driving section 52 is rotated in a direction indicated by the arrow J so that the feed rollers 38 drive the ticket 62a received first out of the compartment 7d, as indicated by the arrow C. The ticket 62a is further driven into the transport path 58 by the transport rollers 60 and 61. As the sensor 59 senses the leading edge of the ticket 62a at a time $T_{36}$, the stepping motor 53 is deenergized at a time $T_{37}$ and, subsequently, the solenoid 46 is deenergized at a time $T_{38}$ to stop pulling its plunger 46a. The bracket 48, therefore, is moved away from the stationary subsection 2 to its inoperative position in a direction indicated by an arrow M by a biasing member, not shown. Thereafter, the ticket 62a is transported in the direction C by the transport rollers 60 and 61 of the apparatus body and further to the outlet of the terminal equipment by the transport rollers of the equipment, not shown.

When the output of the sensor 59 representative of the presence of the ticket 62a disappears at a time $T_{39}$, the stepping motor 13 of the movable storing subsection 5 is rotated at a time $T_{40}$ to rotate the sectorial plate 7 in the direction E until the compartment 7e next to the compartment 7d reaches the feed start position. At a time $T_{41}$, the rotation of the stepping motor 13 is stopped. At a time $T_{42}$ which is later than the time $T_{41}$ by a predetermined period of time, such a repetitive sequence of steps begins so as to drive the ticket 62b out of the compartment 7e.

The first-in, last-out and first-in, first-out procedures stated above are executed under the control of control programs which are stored in a memory built in the controller 63. One can select either one of the first-in, last-out and first-in, first-out modes by manipulating the operation board of the terminal equipment, not shown. The first-in, first-out mode operation may alternatively be executed by driving the solenoid 46 instead of the solenoid 30 at the timings of the solenoid 30 which are shown in FIG. 4, substituting the solenoids 30 and 40 shown in FIG. 5B with respect to the control waveform, and rotating the stepping motor 53 at the same timings in a direction indicated by an arrow K.

While in the illustrative embodiment the mechanism for driving the movable storing subsection 5 is implemented by a stepping motor, it may alternatively be implemented by a pawl and ratchet wheel device which is driven by a fluid-operated cylinder or an electrically operated solenoid. The rollers included in the transporting section are a specific form of rotatable bodies and may be replaced with a combination of rollers or pulleys and a belt. Further, the plates 8 which define the compartments of the movable subsection 5 are only illustrative and may be replaced with wires which are individually bent by imitating the contour of the plates 8 and implanted on the sectorial plate 7.

Figure 8:
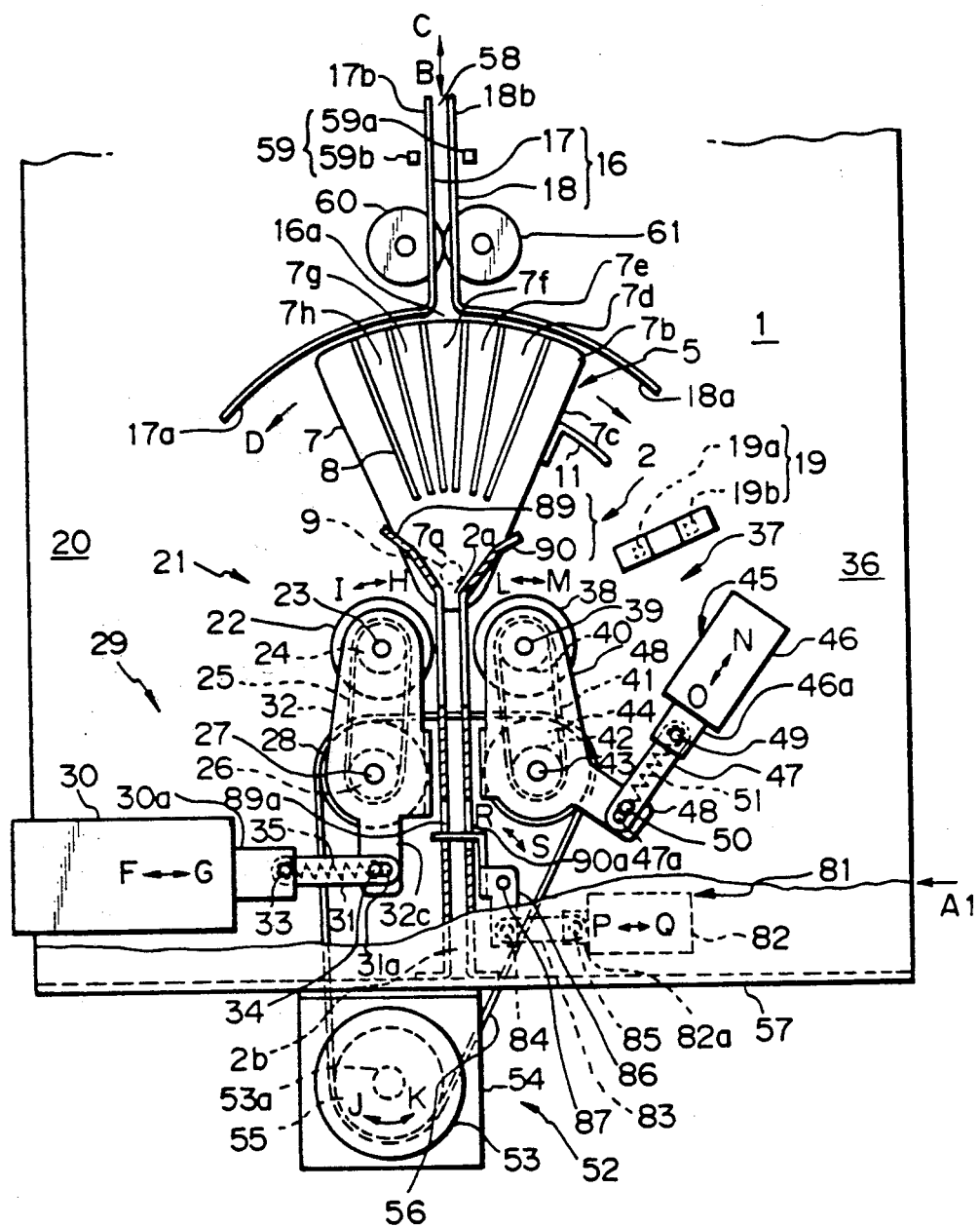
FIG. 8 is a partly taken away and partly sectional elevation similar to FIG. 1, showing an alternative embodiment of the temporary slip stacking apparatus in accordance with the present invention.
Figure 9:
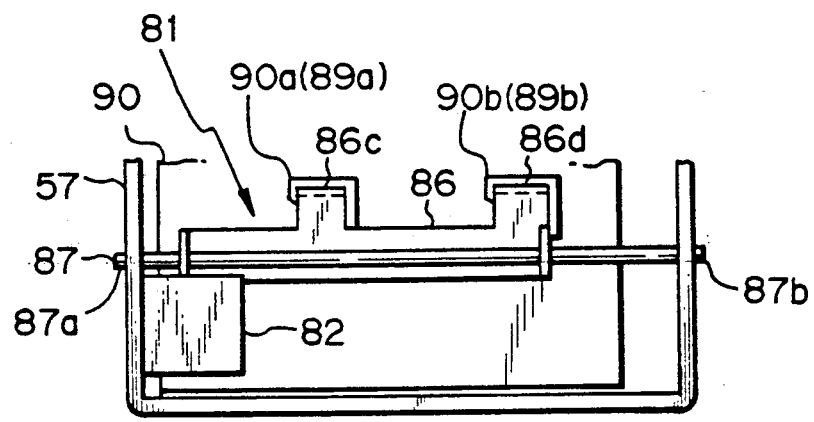
FIG. 9 is a fragmentary side elevation of the apparatus shown in FIG. 8 as viewed in a direction A1 in the figure.

Referring to FIGS. 8 and 9, an alternative embodiment of the temporary slip stacking apparatus in accordance with the present invention will be described. The alternative embodiment is distinguishable over the embodiment of FIG. 1 in that a stop mechanism 81 is associated with the stationary storing subsection 2, and in that limiters 86c and 86d, FIG. 10, are movable into and out of the space 2b of the stationary subsection 2 in matching relation to the length of slips as measured in the intended direction of transport.

Figure 10:
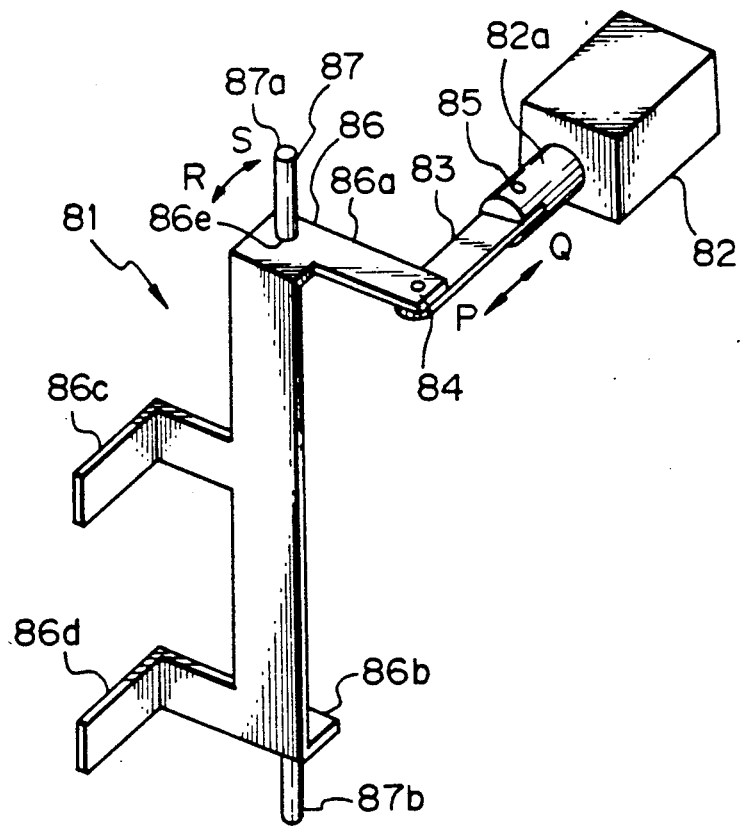
FIG. 10 is a perspective view of a stop mechanism included in the embodiment of FIG. 8.

As shown in FIG. 10, the stop mechanism 81 has a solenoid 82 having a plunger 82a, a link 83, a stop 86, and a shaft 87 which defines the axis of rotation of the stop 86. The link 83 is movably connected at one end to the stop 86 by a pin 84 and at the other end to the plunger 82a of the solenoid 82 by a pin 85. Generally configured in the form of a letter U, the stop 86 has arms 86a and 86b each being formed with an opening (only opening 86e in arm 86a is shown) and is rigidly mounted on an intermediate portion of the shaft 87. As shown in FIG. 9, the shaft 87 is journalled to the frame 57 of the apparatus body at opposite ends 87a and 87b thereof. The solenoid 82 is securely mounted on the frame 57. The stationary storing subsection 2 has plates 89 and 90 which are provided with rectangular openings 89a and 89b and similar openings 90a and 90b, respectively. The limiters 86c and 86d of the stop 86 are retractably received in the aligned openings 89a and 90a and the aligned openings 89b and 90b, respectively, as shown in FIGS. 8 and 9. More specifically, when the stop 86 is rotated about the shaft in a direction indicated by an arrow R, the limiters 86c and 86d penetrate the space 2b of the stationary subsection 2 through those openings.

In operation, when the operator presses the switch 80 of the apparatus body shown in FIG. 3, the controller 63 brings the movable storing subsection 5 shown in FIG. 8 to the home position, as depicted in FIG. 1. Next, the operator operates a particular switch, not shown, associated with the kind of slips to be stacked in the apparatus, e.g., a switch associated with slips which are comparatively short as measured in the intended direction of transport. In response, the controller 63 energizes the solenoid 82 of the stop mechanism 81 to cause it to pull the plunger 82a. As a result, the stop 86 is rotated in the direction R to thrust the limiters 86c and 86d into the space 2b of the stationary subsection 2. In this condition, when a slip which is comparatively short as mentioned above is inserted into the inlet of the terminal equipment, it is driven along the transport path into the temporary stacking apparatus in the same manner as in the first embodiment. In the apparatus, the slip is settled in the receiving section 1 with its leading edge abutting against the limiters 86c and 86d of the stop 86. Thereafter, it will be fed out of the apparatus toward the outlet of the terminal equipment.

On the other hand, when the operator presses another switch which is associated with comparatively long slips, the controller 63 turns off the solenoid 82 with the result that the plunger 82a of the solenoid 82 is urged in a direction P by a biasing means, not shown. This causes the stop 86 to rotate in a direction S and thereby moves the limiters 86c and 86d out of the space 2b of the stationary storing subsection 2. The apparatus is now ready to receive and send out comparatively long slips one by one by the same procedure as described in relation to the first embodiment. While the stop mechanism 81 has been shown and described as being operated in response to the operator's manipulation of a particular switch, a sensor responsive to the length of a slip as measured in the intended direction of transport may be located on the transport path so as to control the stop mechanism 81 on the basis of an output of the sensor. This will be successful in freeing the operator from the extra operation for entering the kind of slips on a switch, i.e., all that is required will be inserting tickets into the inlet.

In summary, it will be seen that the present invention provides a temporary slip stacking apparatus which is operable in a first-in, first-out mode with a first and a second feeding section. The apparatus, therefore, promotes rapid exchange of primary slips for secondary slips, e.g., exchange of flight reservation tickets for boarding tickets in the same order as the customers who are waiting in line at the counter of an airport. Since the first and second feeding sections can be used alternately, the wear of rotatable members included in the apparatus is slowed down to increase the period at which they need replacement and, hence, the operation rate of the apparatus is increased. A stop mechanism is installed in a storing section of the apparatus so as to accommodate slips of different lengths as needed, broadening the range of slips which the apparatus can deal with.

While the present invention has been described with reference to the particular illustrative embodiments, it is not to be restricted by those embodiments only but only by the appended claims. It is to be appreciated that those skilled in the art can change or modify the embodiments without departing from the scope and spirit of the present invention.

What is claimed is:

1. An apparatus for receiving slips and stacking the slips temporarily for processing the slips or exchanging the slips for another kind of slips, comprising:

transport path means for defining a path for receiving and transporting a slip;

stationary storing means for holding the slip temporarily in a space therein;

feeding means for feeding the slip out of said stationary storing means and feeding the slip transported by said transport path means into said stationary storing means;

movable storing means interposed between said transport path means and said stationary storing means for accommodating in each of a number of compartments defined therein a part of any of the slips received by the apparatus, said movable storing means comprising a plurality of partition members, a first rotatable member supporting said plurality of partition members, and a support member supporting said first rotatable member, said plurality of partition members extending radially toward said support member to define said compartments in cooperation with nearby ones of said partition members, said compartments being so oriented as to commonly communicate with said stationary storing means and to communicate with said transport path means one at a time; and first driving means for rotating said first rotatable member about said support member;

said transport path means comprising a stop and guide member, having an opening communicating with the path, for closing ends of said compartments except for one compartment which is held in communication with said transport path means via said opening;

said feeding means comprising:

first feeding means, having a first rotatable body on a first side of said stationary storing means, for urging said first rotatable body toward the space, and for driving said first rotatable body to feed the slip into said space;

second feeding means, having a second rotatable body located at a second side of said stationary storing means opposite said first side for urging said second rotatable body toward the space and driving said second rotatable body to feed the slip out of said space;

said apparatus further comprising control means for controlling said first driving means and said first and second feeding means to feed the slip in and out of the stationary storing means in a first-in, first-out mode;

said control means controlling, when the slip is to be fed into said stationary storing means, said first driving means for rotating said first rotatable member to bring one of said compartments with respect to a first order into communication with said transport path means, and controlling said first feeding means to drive said first rotatable body so as to introduce the slip into the space such that the slip adjoins other slips arranged in the space in an order of having been previously introduced into the space under the control of said control means, while being partly left in said one of said compartments;

said control means controlling, when the slip is to be fed out of said stationary storing means in the first-in, first-out mode, said first driving means for rotating said first rotatable member to bring the one of said compartments with respect to the first order into communication with said transport path means, and controlling said second feeding means for driving said second rotatable body to feed the slip out of the space through said one of said compartments.

2. An apparatus in accordance with claim 1, wherein said first feeding means comprises first urging means which is controlled by said control means for urging said first rotatable body toward the space;

said second feeding means comprising second urging means which is controlled by said control means for urging said second rotatable body toward the space;

said first and second feeding means further comprising second driving means which is linked with said first and second rotatable bodies for driving said first and second rotatable bodies;

said control means controlling, when the slip is to be fed into said stationary storing means, said first urging means for urging said first rotatable body toward the space, and controlling said second driving means for introducing the slip into said space such that the slip adjoins the other slips in order;

said control means controlling, when the slip is to be fed out of said stationary storing means in the first-in, first-out mode, said second urging means for urging said second rotatable body toward the space, and controlling said second driving means for feeding the slip out of said space via said one of said compartments.

3. An apparatus in accordance with claim 2, wherein said first urging means comprises:

a first fulcrum having a first end and a second end opposite the first end;

a second rotatable member rotatable about said first falcrum, provided at said first end of the first fulcrum, said first fulcrum supporting said first rotatable body rotatably at the second end of the first fulcrum; and a first drive source energizable by said control means and linked with said second rotatable member and, when energized by said control means, rotating said second rotatable member;

said second urging means comprising:

a second fulcrum having a third end and a fourth end opposite the third end;

a third rotatable member rotatable about said second fulcrum, provided at said third end of said second fulcrum, said second fulcrum supporting said first rotatable body rotatably at the fourth end of said second fulcrum; and a second drive source energizable by said control means and linked with said third rotatable member and, when energized by said control means, rotating said third rotatable member.

4. An apparatus in accordance with claim 3, wherein said first urging means further comprises first pulley means which is rotatably supported by said first fulcrum and linked with said first rotatable body;

said second urging means further comprising second pulley means which is rotatably supported by said second fulcrum and linked with said second rotatable body;

said second driving means comprising a belt which is linked with said first and second pulley means and driven by said second driving means.

5. An apparatus in accordance with claim 2, wherein said control means controls; when the slip is to be fed out of said stationary storing means in a first-in, last-out mode, said first urging means to urge said first rotatable body toward the space and controls said second driving means to feed said slip out of said space via said one of said compartments.

6. An apparatus in accordance with claim 1, wherein the stationary storing means further comprises:

limiter means for limiting a length of the slip in the space as measured in an intended direction of transport; and third driving means for moving said limiter means into and out of the space;

said control means controlling, when the slip has a length which is comparatively short as measured in the intended direction of transport and is to be fed into the space, said third control means to move said limiter means into said space.

7. An apparatus in accordance with claim 6, wherein said stationary storing means further comprises a pair of flat plate members individually having generally flat portions which define the space and extending face-to-face and substantially parallel to each other, said flat portions being individually provided with first openings for allowing access of associated ones of said first and second rotatable bodies to the space and second openings for allowing access of said limiter means to the space.

8. An apparatus in accordance with claim 1, wherein the stationary storing means further comprises a pair of flat plate members individually having generally flat portions which define the space and extending face-to-face and substantially parallel to each other, said flat portions being individually provided with openings for allowing access of associated ones of said first and second rotatable bodies to the space.

9. An apparatus in accordance with claim 1, wherein said control means controls, when the slip is to be fed out of said stationary storing means in a first-in, last-out mode, said first driving means for rotating said first rotatable member to bring said one of said compartments with respect to a second order which is opposite to the first order into communication with said transport path means, and controlling said first feeding means for driving said first rotatable body to feed the slip out of the space through said one of said compartments.

10. An apparatus in accordance with claim 1, wherein said transport path means comprises a pair of flat members which define, and provide communication between, the path and the opening;

said first rotatable member having a sectorial configuration a pivot of which is defined by said support member;

said stop and guide member extending in directions of the first and second orders at opposite sides of the opening and generally along an arc of the sectorial configuration of said first rotatable member for closing the ends of said compartments except for the one compartment which is held in communication with said transport path means.

11. An apparatus for receiving slips and stacking the slips temporarily for processing the slips or exchanging the slips for another kind of slips, comprising:

transport path means for defining a path for receiving and transporting a slip;

stationary storing means for holding the slip temporarily in a space therein;

feeding means for feeding the slip out of said stationary storing means and feeding the slip transported by said transport path means into said stationary storing means;

movable storing means interposed between said transport path means and said stationary storing means for accommodating in each of a number of compartments defined therein a part of any of the slips received by the apparatus, said movable storing means comprising a plurality of partition members, a first rotatable member supporting said plurality of partition members, and a support member supporting said first rotatable member, said plurality of partition members extending radially toward said support member to define said compartments in cooperation with nearby ones of said partition members, said compartments being so oriented as to commonly communicate with said stationary storing means and to communicate with said transport path means one at a time; and first driving means for rotating said first rotatable member about said support member;

said transport path means comprising a stop and guide member, having an opening communicating with the path, for closing ends of said compartments except for one compartment which is held in communication with said transport path means via said opening;

said feeding means comprising:

first feeding means, having a first rotatable body on a first side of said stationary storing means, for urging said first rotatable body toward the space, and for driving said first rotatable body to feed the slip into said space;

second feeding means, having a second rotatable body located at a second side of said stationary storing means opposite said first side for urging said second rotatable body toward the space and driving said second rotatable body to feed the slip out of said space;

said apparatus further comprising control means for controlling said first driving means and said first and second feeding means to feed the slip in and out of the stationary storing means in a first-in, first-out mode;

said control means controlling, when the slip is to be fed into said stationary storing means, said first driving means for rotating said first rotatable member to bring one of said compartments into communication with said transport path means, and controlling said first feeding means to drive said first rotatable body so as to introduce the slip into the space such that the slip adjoins other slips arranged in the space in an order of having been previously introduced into the space under the control of said control means, while being partly left in said one of said compartments;

said control means controlling, when the slip is to be fed out of said stationary storing means in the first-in, first-out mode, said first driving means for rotating said first rotatable member to bring the one of said compartments into communication with said transport path means, and controlling said second feeding means for driving said second rotatable body to feed the slip out of the space through said one of said compartments.

12. An apparatus in accordance with claim 11, wherein said control means controls, when the slip is to be fed out of said stationary storing means in a first-in last-out mode, said first driving means for rotating said first rotatable member to bring said one of said compartments into communication with said transport path means, and controlling said first feeding means for driving said first rotatable body to feed the slip out of the space through said one of said compartments.

* * * * *